June 1, 1943.　　　O. W. EHLERS　　　2,320,856
TIRE CARRIER FOR THE COVER OF AN AUTOMOBILE LUGGAGE COMPARTMENT
Filed July 30, 1940　　　2 Sheets-Sheet 1
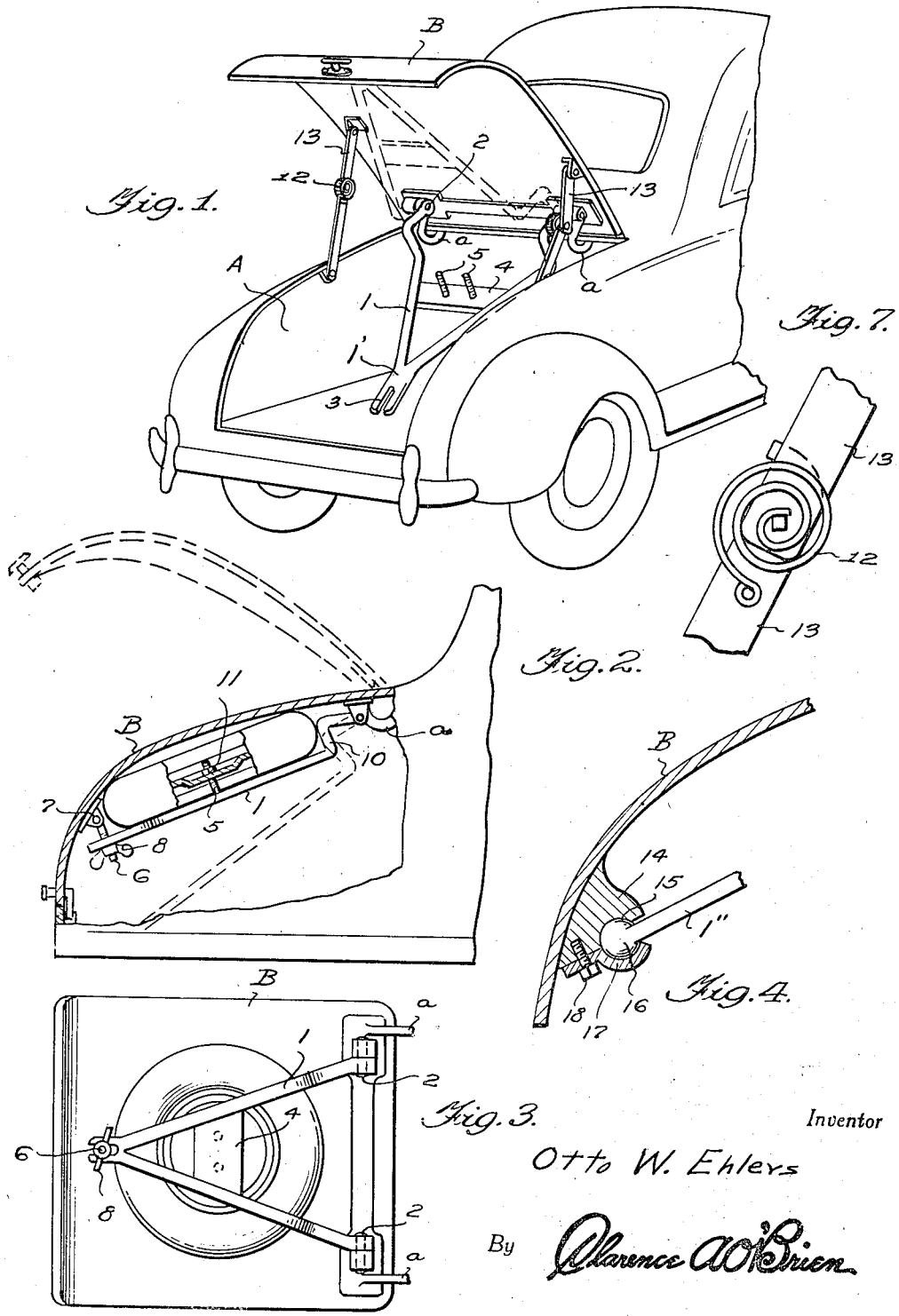
Inventor
Otto W. Ehlers
By Clarence A. O'Brien
Attorney June 1, 1943.  O. W. EHLERS  2,320,856
TIRE CARRIER FOR THE COVER OF AN AUTOMOBILE LUGGAGE COMPARTMENT
Filed July 30, 1940  2 Sheets-Sheet 2

Inventor
Otto W. Ehlers
By Clarence A. O'Brien
Attorney

Patented June 1, 1943

2,320,856

UNITED STATES PATENT OFFICE 2,320,856

TIRE CARRIER FOR THE COVER OF AN AUTOMOBILE LUGGAGE COMPARTMENT

Otto W. Ehlers, Los Angeles, Calif.

Application July 30, 1940, Serial No. 348,573

1 Claim. (Cl. 224—29)

This invention relates to a tire carrier for the door or cover of a luggage carrier or trunk of an automobile, the general object of the invention being to provide a member hinged at its rear end to the under portion of the cover adjacent the hinge thereof with means for detachably connecting a wheel and its tire to the member and with latch means for detachably holding the member in position under the cover with the wheel between itself and the underside of the cover so that the wheel will take up but little room in the compartment, thereby giving more room for luggage.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 1 is a perspective view of a turtle back automobile with the luggage compartment door in raised position and showing the wheel carrier in lowered position.

Figure 2 is a fragmentary side view of the rear part of the automobile with parts broken away and parts in section and showing the carrier in raised and supporting position, this view also showing the door in raised position and the carrier in lowered position in dotted lines.

Figure 3 is a view of the underside of the door or cover with the carrier in carrying position and supporting a wheel.

Figure 4 is a detail sectional view showing a modified form of cap for the carrier and a slightly different form of carrier.

Figure 7 is a view showing spring means between the toggle links which hold the cover in raised position.

Figure 5:
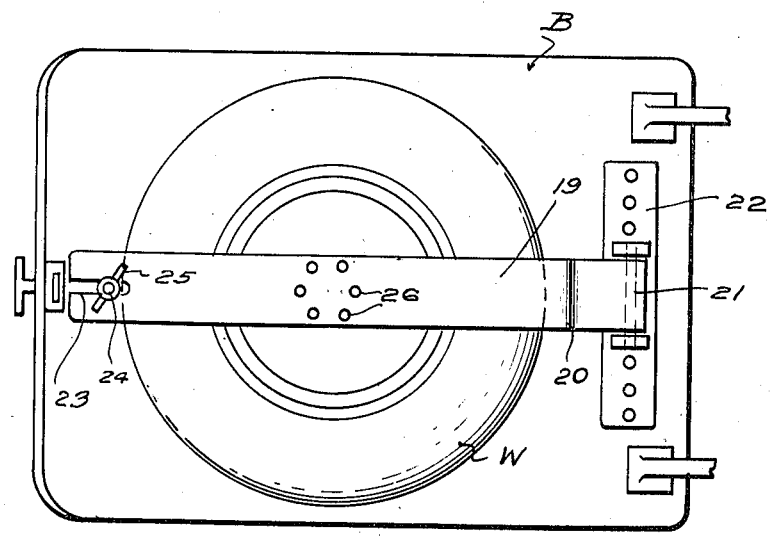
Figure 5 is a view similar to Figure 3 but showing a modification.

Referring to Figures 1, 2 and 3, the luggage compartment is shown at A and its cover or door at B, the hinge for the front end of the cover being shown at $a$. In carrying out the invention a substantially Y-shaped member 1 is pivoted at the ends of its limbs to the underside of the covers as shown at 2 and these hinges may be parts of the hinges $a$ or separate parts. The stem 1' of the Y-shaped member is flat and has a slot 3 therein. A cross plate 4 extends across intermediate portions of the limbs of the Y-shaped member and has its ends connected to the limbs and bolts 5 extend upwardly from the plate for passing through some of the holes of the wheel W which ordinarily receive bolts for connecting the wheel to the hub. A bolt 6 is hinged to the free end of the cover as shown at 7 and when the carrier 1 is swung upwardly this bolt can be swung into the slot 3 and then a wing nut 8 is threaded on the bolt 6 to hold the member 1 in raised position. The limbs of the member 1 adjacent the pivotal point are bent downwardly as shown at 10 for a short distance with the major portions of the limbs extending at right angles from these bent portions 10 so that the major portion of the member 1 is offset downwardly so as to form room between itself and the underface of the cover B for the wheel and its tire.

Thus it will be seen that it is simply necessary to swing the member 1 downwardly after the cover B has been raised and then the wheel is placed on the member 1 with the bolts 5 passing through some of the holes in the wheel after which nuts 11 are placed on the bolts to hold the wheel to the member 1. Then the member is swung upwardly and held in this position by the bolt 6 and its nut 8 so that the parts will assume the position shown in Figure 2. Of course, to remove the wheel the cover is raised, the nut 8 loosened so that the member 1 can be lowered and then the wheel is taken off of the member 1 by removing the nuts 11. Thus it will be seen that the wheel is held against the underside of the cover or door B where it will be out of the way of the luggage placed in the compartment and the wheel and the carrier will occupy but little space so that the maximum amount of luggage can be placed in the compartment A.

In order to overcome the additional weight of the carrier and the wheel I make the springs 12 of the toggle links 13 which connect the cover or door to the side walls of greater strength than the original springs so that these stronger springs 12 will facilitate raising and lowering the door or cover. One of these springs is shown in Figure 7.

Instead of providing the bolt 6 and the nut 8, I may provide a lug 14 on the underside of the cover adjacent its free end and said lug having a substantially semi-spherical recess 15 therein and also provide a spherical member 16 on the stem 1'' of the carrier for properly fitting in this recess when the carrier is in raised position. A plate 17 is fastened to the lug 14 by a bolt 18 and this plate has a substantially semi-spherical recess therein to receive another part of the member 16 so that by tightening the bolt the carrier is held in raised position.

Figure 6:
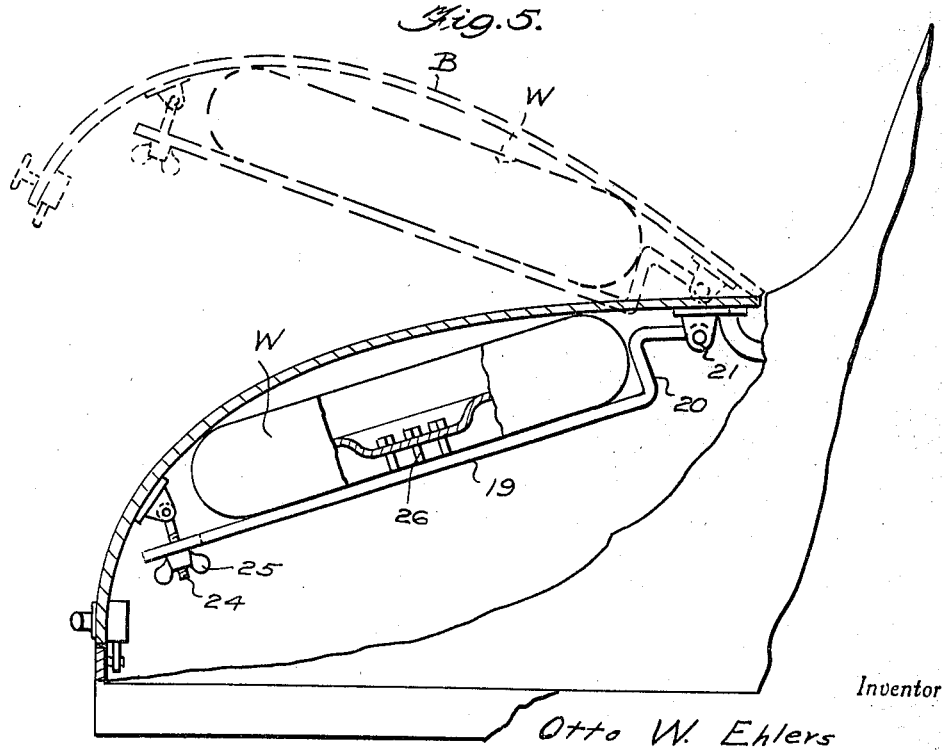
Figure 6 is a view similar to Figure 2 but showing a carrier shown in Figure 5.

Figures 5 and 6 show another form of the invention in which the carrier is made in the form of a flat bar 19 which also has an offset part 20 and said plate is hinged as at 21 to a plate 22 fastened to the underside of the cover B adjacent the end edge thereof. This plate has a slot 23 in its free end for receiving a pivoted bolt 24, a wing nut 25 being threaded on the bolt to hold the carrier 19 in raised position. Bolts 26 are carried by the member 19 to pass through holes in the wheel to hold the wheel to the member 19 as shown more particularly in Figure 6. In other respects this form of the invention is similar to that before described.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In an automobile including a rear luggage compartment, and a closure cover for said compartment hinged at its front end for vertical swinging into opening and closing positions and provided with a downwardly curving rear end, a spare tire carrier beneath said cover comprising a support upon which a tire is freely slidable and having a front end hinged to the under face of said cover adjacent the front end of the latter, and a rear end adapted to be fastened to said cover whereby when said rear end thereof is fastened, said support is swingable with the cover and when said rear end is unfastened and the cover opened said support is swingable downwardly on said cover into said compartment for access thereto, means to secure a tire on top of said support for carrying between the same and said cover, the major portion of said support being downwardly offset from the front end thereof to space the same from said cover when the support is fastened, and means to fasten the rear end of the support to the curved rear end of the cover to space said end of the support from the top of said cover said front end of the support being of angular form and providing a right angled front end abutment for limiting forward sliding of the tire on the support, said support and fastening means being constructed and arranged to clamp the tire against said cover.

OTTO W. EHLERS.